(No Model.)

A. WILLIAMS.
DROP HAMMER LIFTER.

No. 310,969. Patented Jan. 20, 1885.

Witnesses:
Jas. F. Duhamel
Walter S. Dodge

Inventor:
Alfred Williams,
by Dodge & Son,
Attys.

UNITED STATES PATENT OFFICE.

ALFRED WILLIAMS, OF MOLINE, ILLINOIS, ASSIGNOR TO WILLIAMS, WHITE & CO., OF SAME PLACE.

DROP-HAMMER LIFTER.

SPECIFICATION forming part of Letters Patent No. 310,969, dated January 20, 1885.

Application filed January 2, 1883. (No model.)

*To all whom it may concern:*

Be it known that I, ALFRED WILLIAMS, a citizen of the United States, residing at Moline, Rock Island county, State of Illinois, have invented certain new and useful Improvements in Drop-Hammer Lifters, of which the following is a specification.

My invention relates to drop-hammer lifters, and is designed as an improvement upon that for which Letters Patent of the United States were issued to C. G. Cross on the 1st day of June, 1880, and numbered 228,324.

Figure 1:
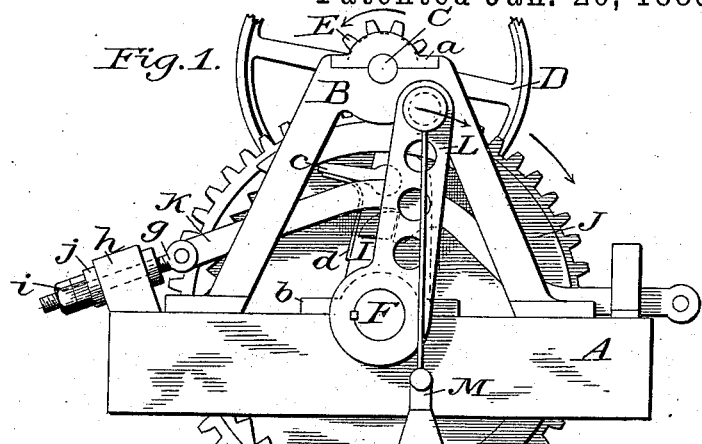
Figure 2:
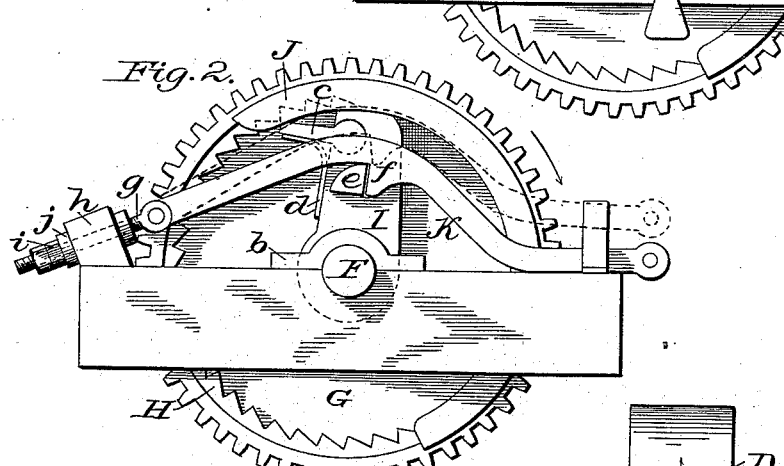
Figure 3:
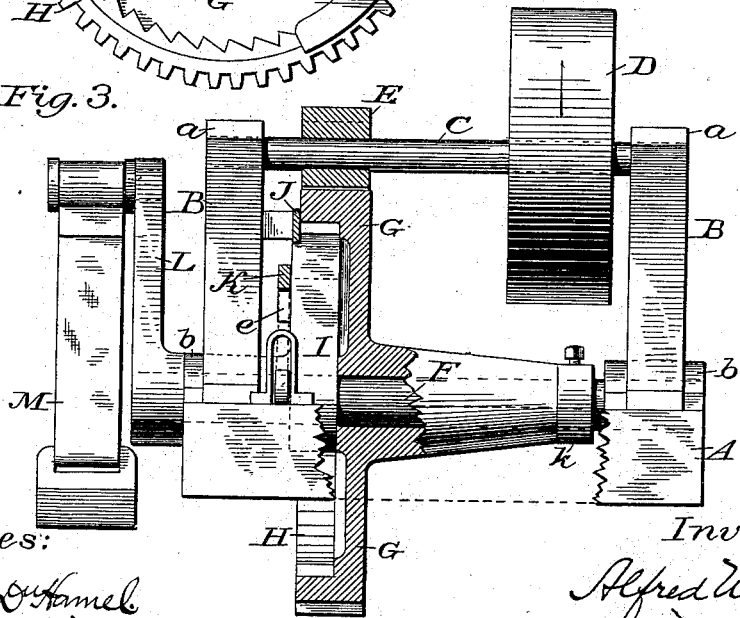

In the accompanying drawings, Figure 1 is a side view of my improved device; Fig. 2, a similar view with the upright supports and the lifting-crank removed; Fig. 3, a front view, partly in section.

The objects of my invention are to render positive the action of the pivoted pawl, which engages with the annular ratchet, and to relieve the machine of the jar incident to the rise and engagement of the inner arm with the releasing-lever.

In its general construction the machine is similar to that shown in the patent above referred to.

A indicates the base or sill frame, upon which are mounted the upright supporting-frames B, said frames having at their tops boxes $a$, to receive the shaft C, carrying band-wheel D and gear E.

F indicates a second shaft, extending across the timbers or sills A below and parallel with shaft C, and carried in boxes $b$ on the sills, as shown in Figs. 1, 2, and 3. The shaft F has loosely mounted upon it a large gear-wheel, G, which rotates freely upon said shaft in the direction indicated, when motion is imparted to it through pinion E and band-wheel D, the said wheel G having an annular series of internal ratchet-teeth, H, in its face, as shown.

Mounted upon shaft F and turning therewith is an arm, I, which rotates within the depressed or recessed outer face of wheel G, and which carries a pivoted pawl or dog, $c$, to engage with the ratchet-teeth H of the wheel G. The dog is forced into engagement with the ratchet-teeth by a spring, $d$, bearing upon the under side thereof, as shown in Figs. 1 and 2, and is retained in engagement with the teeth until released or removed by a curved guard, J. The arm I has also a stop or projection, $e$, which engages with a lug or projection, $f$, upon a pivoted lever, K, when the arm I reaches a vertical or slightly-inclined position, as in Figs. 1 and 2.

L indicates a crank-arm attached rigidly to the outer end of shaft F, and provided with an adjustable crank-pin, to which the hammer is attached by a metal strap, M, or equivalent device. The crank-arm L, as shown in Fig. 1, is set a little to one side of the center of the shaft F, so that the preponderance of weight shall cause the crank and hammer to fall when the arm I is released.

The lever K is pivoted to an eyebolt, $g$, which passes through a block, $h$, on the base-frame A, said bolt $g$ being secured therein by nuts $i$, a cushion, $j$, of rubber, or a spiral spring being interposed between the block $h$ and the nuts $i$, in order to take up the shock or concussion due to the engagement of the lugs $e\,f$. This construction will allow the lever K to be adjusted, and thus regulate the distance to which the arms I and L may move before being brought to rest. The guard J covers about one-half the ratchet-wheel H, and is of a width a little greater than the depth of the latter, so that when the arm I and its pawl $c$ assume a nearly vertical position the pawl will strike the end of the guard and be thrown out of engagement with the ratchet-teeth H, as shown in Fig. 2. The wheel G is secured between the uprights by the arm I on one side and a collar, $k$, at the other.

The operation of the device is as follows: Motion being imparted to wheel D is transmitted to gear G through pinion E, and as the wheel G is loose upon shaft F it may be rotated at pleasure independently of arm I and crank-arm L. The hammer is supposed to be elevated, as in all the figures the crank-arm L and arm I are at their highest points. If, now, it be desired to strike a blow, the operator raises the free end of lever K, which allows the lug $e$ to pass the lug or stop $f$ on the lever K, and as the weight carried by or suspended from the arm L is to one side of the center of the shaft F, the weight and crank-arm L will descend to a point below the shaft F. As the arm I, like the crank-arm L, is rigidly attached to shaft F, it will of course move with the latter when it makes its quick descent, just described, the guard J during this time still holding the pawl c out of the ratchet-teeth against the force of spring d. As the pawl c rides off the lower end of the guard J it is thrown outward by the spring d into engagement with the ratchet-teeth H, and as the wheel G is rotating in the same direction the arm I and the crank-arm L are raised up and moved with the wheel G until the dog or pawl c strikes the guard J and disconnects the wheel G and the arm I by the disengagement of the pawl and ratchet. The arm I is then stopped by engagement of the lugs e f. The wheel G continues to rotate constantly, and when it is desired to strike another blow the lever K is again raised, the arms L and I descend, and with them the hammer, the pawl c again connects the arm I and the wheel G, and the former is raised and locked in position, ready for a new stroke or blow. As the lug e on arm I comes in contact with the shoulder f a considerable jar or shock is given to the machinery as ordinarily constructed; but by the interposition of the spring-block j this jar or shock is taken up, and thus the machine is relieved of the sudden jar and strain and the noise is materially reduced. By pivoting the pawl c in the manner shown and providing it with a spring its action is rendered certain and quick, whereas a pawl, acting by gravity alone, is liable to fail in operation or to act so slowly as to impair the efficiency of the machine. The pawl c may be made of a width a little greater than the depth of the ratchet-teeth H and the guard J, and in such case the pawl will not extend up behind the guard J when raised out of engagement with the ratchet-teeth H. The pawl may, however, as in the patent to Cross, above referred to, be made with an offset or shoulder, which bears upon the guard and which allows the inner end of the pawl to remain behind the guard, though not allowing it to engage with the ratchet-teeth H. This feature is immaterial, however, as the pawl works equally well under either plan.

It is obvious that the nuts i i can be dispensed with, and a head or enlargement formed upon the eyebolt g, which will serve the same purpose as the nuts.

Having thus described my invention, what I claim is—

1. In a drop-hammer lifter, the combination of wheel G, provided with teeth H, arm I, provided with pawl c, spring d, serving to hold said pawl in engagement with the teeth H, and crank-arm L, provided with hammer M and connected with arm I, substantially as described and shown.

2. In a hammer-lifter substantially such as described and shown, the combination of wheel G, arm I, provided with lug e, latch K, provided with lug f, and a cushioned or yielding support for said latch, for the purpose explained.

3. In a hammer-lifter substantially such as described and shown, the combination of wheel G, having teeth H, arm I, having pawl c and lug e, fixed block h, eyebolt g, cushion j, nut or enlargement i, and latch K, pivoted to said eye-bolt and provided with lug f, all substantially as set forth.

ALFRED WILLIAMS.

Witnesses:
H. A. AINSWORTH,
G. G. ANDERSON.